US007450900B2

(12) United States Patent
van Rooyen

(10) Patent No.: US 7,450,900 B2
(45) Date of Patent: Nov. 11, 2008

(54) METHOD AND SYSTEM FOR CELLULAR NETWORK AND INTEGRATED BROADCAST TELEVISION (TV) DOWNLINK WITH INTELLIGENT SERVICE CONTROL

(75) Inventor: Pieter Gert Wessel van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 622 days.

(21) Appl. No.: 11/010,877

(22) Filed: Dec. 13, 2004

(65) Prior Publication Data

US 2006/0128375 A1  Jun. 15, 2006

(51) Int. Cl.
*H04H 7/00* (2006.01)
(52) U.S. Cl. .................... 455/3.06; 455/3.02; 455/3.04; 455/12.1; 455/556.1; 370/354; 370/395.21; 370/493; 725/73; 725/76; 725/147
(58) Field of Classification Search .............. 455/552.1, 455/3.02, 556.1, 3.04, 418, 431, 426.1, 3.01, 455/456.1, 414.1, 12.1, 413, 575.7, 3.06; 370/336, 493, 352–356, 395.21, 395.71; 725/112, 109, 138, 75–77, 1, 30, 153, 73
See application file for complete search history.

(56) References Cited

U.S. PATENT DOCUMENTS

| | | | |
|---|---|---|---|
| 6,643,510 B2 * | 11/2003 | Taylor ......................... 455/431 |
| 6,650,374 B2 * | 11/2003 | Choi et al. ................... 348/723 |
| 7,103,374 B2 | 9/2006 | Yla-Jaaski et al. |
| 2002/0010763 A1 * | 1/2002 | Salo et al. .................... 709/220 |
| 2003/0228892 A1 * | 12/2003 | Maalismaa et al. ........ 455/575.7 |
| 2004/0198217 A1 * | 10/2004 | Lee et al. .................... 455/3.01 |
| 2005/0215194 A1 * | 9/2005 | Boling et al. .............. 455/3.02 |
| 2006/0128304 A1 | 6/2006 | Ramaswamy |
| 2006/0193295 A1 * | 8/2006 | White et al. ................ 370/336 |

* cited by examiner

*Primary Examiner*—Sujatha Sharma
(74) *Attorney, Agent, or Firm*—McAndrews, Held & Malloy

(57) ABSTRACT

A method and system for communicating information via a plurality of different networks may comprise requesting in a mobile terminal capable of receiving and processing cellular frequency band services and VHF/UHF broadcast frequency band services, media having a specified quality of service. A description of said requested media and/or a quality of service associated with the requested media may be displayed via a user interface in the mobile terminal. An input may be received in the mobile terminal that indicates at least one required quality of service associated with the requested media. Based on information stored in the mobile terminal, at least one required quality of service associated with the requested media may be determined. One or more required quality of service associated with the requested media may be stored in a profile within the mobile terminal.

33 Claims, 12 Drawing Sheets

METHOD AND SYSTEM FOR CELLULAR NETWORK AND INTEGRATED BROADCAST TELEVISION (TV) DOWNLINK WITH INTELLIGENT SERVICE CONTROL

CROSS-REFERENCE TO RELATED APPLICATIONS/INCORPORATION BY REFERENCE

This application makes reference to:
U.S. patent application Ser. No. 11/010,991, now U.S. Pat. No. 7,286,794, filed Dec. 13, 2004;
U.S. patent application Ser. No. 11/010,847, filed Dec. 13, 2004;
U.S. patent application Ser. No. 11/010,877, filed Dec. 13, 2004;
U.S. patent application Ser. No. 11/010,914, filed Dec. 13, 2004;
U.S. patent application Ser. No. 11/010,486, filed Dec. 13, 2004;
U.S. patent application Ser. No. 11/010,903, now U.S. Pat. No. 7,324,832, filed Dec. 13, 2004;
U.S. patent application Ser. No. 11/011,009, filed Dec. 13, 2004;
U.S. patent application Ser. No. 11/010,855, filed Dec. 13, 2004;
U.S. patent application Ser. No. 11/010,743, now U.S. Pat. No. 7,242,960, filed Dec. 13, 2004;
U.S. patent application Ser. No. 11/010,983, filed Dec. 13, 2004;
U.S. patent application Ser. No. 11/011,000, filed Dec. 13, 2004;
U.S. patent application Ser. No. 11/010,681, filed Dec. 13, 2004;
U.S. patent application Ser. No. 11/010,883, now U.S. Pat. No. 7,313,414, filed Dec. 13, 2004;
U.S. patent application Ser. No. 11/011,006, filed Dec. 13, 2004;
U.S. patent application Ser. No. 11/010,487, filed Dec. 13, 2004;
U.S. patent application Ser. No. 11/010,481, filed Dec. 13, 2004; and
U.S. patent application Ser. No. 11/010,524, filed Dec. 13, 2004.

All of the above stated applications are hereby incorporated herein by reference in their entirety.

FIELD OF THE INVENTION

Certain embodiments of the invention relate to communication of information via a plurality of different networks. More specifically, certain embodiments of the invention relate to a method and system for cellular network services and integrated broadcast television (TV) with intelligent service control.

BACKGROUND OF THE INVENTION

Broadcasting and telecommunications have historically occupied separate fields. In the past, broadcasting was largely an "over-the-air" medium while wired media carried telecommunications. That distinction may no longer apply as both broadcasting and telecommunications may be delivered over either wired or wireless media. Present development may adapt broadcasting to mobility services. One limitation has been that broadcasting may often require high bit rate data transmission at rates higher than could be supported by existing mobile communications networks. However, with emerging developments in wireless communications technology, even this obstacle may be overcome.

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology that may introduce fully packet-switched networks, which support high-speed data communications.

The general packet radio service (GPRS), which is an example of a 2.5G network service oriented for data communications, comprises enhancements to GSM that required additional hardware and software elements in existing GSM network infrastructures. Where GSM may allot a single time slot in a time division multiple access (TDMA) frame, GPRS may allot up to 8 such time slots providing a data transfer rate of up to 115.2 kbits/s. Another 2.5G network, enhanced data rates for GSM evolution (EDGE), also comprises enhancements to GSM, and like GPRS, EDGE may allocate up to 8 time slots in a TDMA frame for packet-switched, or packet mode, transfers. However, unlike GPRS, EDGE adapts 8 phase shift keying (8-PSK) modulation to achieve data transfer rates that may be as high as 384 kbits/s.

The universal mobile telecommunications system (UMTS) is an adaptation of a 3G system, which is designed to offer integrated voice, multimedia, and Internet access services to portable user equipment. The UMTS adapts wideband CDMA (W-CDMA) to support data transfer rates, which may be as high as 2 Mbits/s. One reason why W-CDMA may support higher data rates is that W-CDMA channels may have a bandwidth of 5 MHz versus the 200 kHz channel bandwidth in GSM. A related 3G technology, high speed downlink packet access (HSDPA), is an Internet protocol (IP) based service oriented for data communications, which adapts W-CDMA to support data transfer rates of the order of 10 Mbits/s. HSDPA achieves higher data rates through a plurality of methods. For example, many transmission decisions may be made at the base station level, which is much closer to the user equipment as opposed to being made at a mobile switching center or office. These may include decisions about the scheduling of data to be transmitted, when data are to be retransmitted, and assessments about the quality of the transmission channel. HSDPA may also utilize variable coding rates in transmitted data. HSDPA also supports 16-level quadrature amplitude modulation (16-QAM) over a high-speed downlink shared channel (HS-DSCH), which permits a plurality of users to share an air interface channel.

The multiple broadcast/multicast service (MBMS) is an IP datacast service, which may be deployed in EDGE and UMTS networks. The impact of MBMS is largely within the network in which a network element adapted to MBMS, the broadcast multicast service center (BM-SC), interacts with other network elements within a GSM or UMTS system to manage the distribution of content among cells within a network. User equipment may be required to support functions for the activation and deactivation of MBMS bearer service. MBMS may be adapted for delivery of video and audio information over wireless networks to user equipment. MBMS may be integrated with other services offered over the wireless network to realize multimedia services, such as multicasting, which may require two-way interaction with user equipment.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The ISDB-T system has been adopted in Japan and adapts bandwidth segmented transmission orthogonal frequency division multiplexing (BST-OFDM). The various DTTB systems may differ in important aspects; some systems employ a 6 MHz channel separation, while others may employ 7 MHz or 8 MHz channel separations. Planning for the allocation of frequency spectrum may also vary among countries with some countries integrating frequency allocation for DTTB services into the existing allocation plan for legacy analog broadcasting systems. In such instances, broadcast towers for DTTB may be co-located with broadcast towers for analog broadcasting services with both services being allocated similar geographic broadcast coverage areas. In other countries, frequency allocation planning may involve the deployment of single frequency networks (SFNs), in which a plurality of towers, possibly with overlapping geographic broadcast coverage areas (also known as "gap fillers"), may simultaneously broadcast identical digital signals. SFNs may provide very efficient use of broadcast spectrum as a single frequency may be used to broadcast over a large coverage area in contrast to some of the conventional systems, which may be used for analog broadcasting, in which gap fillers transmit at different frequencies to avoid interference.

Even among countries adopting a common DTTB system, variations may exist in parameters adapted in a specific national implementation. For example, DVB-T not only supports a plurality of modulation schemes, comprising quadrature phase shift keying (QPSK), 16-QAM, and 64 level QAM (64-QAM), but DVB-T offers a plurality of choices for the number of modulation carriers to be used in the COFDM scheme. The "2K" mode permits 1,705 carrier frequencies that may carry symbols, each with a useful duration of 224 µs for an 8 MHz channel. In the "8K" mode there are 6,817 carrier frequencies, each with a useful symbol duration of 896 µs for an 8 MHz channel. In SFN implementations, the 2K mode may provide comparatively higher data rates but smaller geographical coverage areas than may be the case with the 8K mode. Different countries adopting the same system may also employ different channel separation schemes.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area SFN. There are also significant challenges in deploying broadcast services to mobile user equipment. Many handheld portable devices, for example, may require that services consume minimum power to extend battery life to a level which may be acceptable to users. Another consideration is the Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H).

To meet requirements for mobile broadcasting the DVB-H specification may support time slicing to reduce power consumption at the user equipment, addition of a 4K mode to enable network operators to make tradeoffs between the advantages of the 2K mode and those of the 8K mode, and an additional level of forward error correction on multiprotocol encapsulated data—forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM), which may be most resilient to transmission errors. MPEG audio and video services may be more resilient to error than data, thus additional forward error correction may not be required to meet DTTB service objectives.

Time slicing may reduce power consumption in user equipment by increasing the burstiness of data transmission. Instead of transmitting data at the received rate, under time slicing techniques, the transmitter may delay the sending of data to user equipment and send data later but at a higher bit rate. This may reduce total data transmission time over the air, time, which may be used to temporarily power down the receiver at the user equipment. Time slicing may also facilitate service handovers as user equipment moves from one cell to another because the delay time imposed by time slicing may be used to monitor transmitters in neighboring cells. The MPE-FEC may comprise Reed-Solomon coding of IP data packets, or packets using other data protocols. The 4K mode in DVB-H may utilize 3,409 carriers, each with a useful duration of 448 µs for an 8 MHz channel. The 4K mode may enable network operators to realize greater flexibility in network design at minimum additional cost. Importantly, DVB-T and DVB-H may coexist in the same geographical area. Transmission parameter signaling (TPS) bits that are carried in the header of transmitted messages may indicate whether a given DVB transmission is DVB-T or DVB-H, in addition to indicating whether DVB-H specific features, such as time slicing, or MPE-FEC are to be performed at the receiver. As time slicing may be a mandatory feature of DVB-H, an indication of time slicing in the TPS may indicate that the received information is from a DVB-H service.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for communicating information via a plurality of different networks. The method may comprise requesting in a mobile terminal capable of receiving and processing cellular frequency band services and VHF/UHF broadcast frequency band services, media having a specified quality of service. A description of the requested media and/or a quality of service associated with the requested media may be displayed via a user interface in the mobile terminal. An input may be received in the mobile terminal that indicates at least one required quality of service associated with the requested media. Based on information stored in the mobile terminal, at least one required quality of service associated with the requested media may be determined. One or more required quality of service associated with the requested media may be stored in a profile within the mobile terminal.

The requested media may be received from a wireless service provider providing the cellular frequency band services or from a VHF/UHF broadcast service provider providing the broadcast frequency band services. In an embodiment of the invention, at least a portion of the requested media may be received from a wireless service provider providing the cellular frequency band services, and at least a remaining portion of the requested media from a VHF/UHF broadcast service provider providing the broadcast frequency band services. The mobile terminal may receive the cellular frequency band services, which may be provided via global system for mobile communications (GSM), general packet radio service (GPRS), enhanced data rates for GSM evolution (EDGE), code division multiple access 2000 (CDMA2000), wideband CDMA (WCDMA), high speed downlink packet access (HSDPA) systems, and/or multiple broadcast/multicast service (MBMS). The mobile terminal may receive the VHF/UHF broadcast frequency band services, which may be provided via digital video broadcast (DVB), advanced standards technical committee (ATSC), and/or integrated service digital broadcasting (ISDB). The method may further comprise communicating RF channel condition from the mobile terminal to a service provider providing the cellular frequency band services and the VHF/UHF broadcast frequency band services.

Another embodiment of the invention may provide a machine-readable storage, having stored thereon, a computer program having at least one code section executable by a machine, thereby causing the machine to perform the steps as described above for communicating information via a plurality of different networks.

The system may comprise a mobile terminal capable of receiving and processing cellular frequency band services and VHF/UHF broadcast frequency band services. The mobile terminal may comprise circuit that requests media having a specified quality of service. A user interface in the mobile terminal may be utilized to display a description of the requested media and/or a quality of service associated with the requested media. Circuitry in the mobile terminal may receive an input that indicates at least one required quality of service associated with the requested media. The mobile terminal may comprise memory that stores information that may be utilized to determine at least one required quality of service associated with the requested media. A profile stored in the mobile terminal may store one or more required quality of service associated with the requested media.

Circuitry in the mobile terminal may be adapted to receive the requested media from a wireless service provider providing the cellular frequency band services or from a VHF/UHF broadcast service provider providing the broadcast frequency band services. In an embodiment of the invention, circuitry in the mobile terminal may receive at least a portion of the requested media from a wireless service provider providing the cellular frequency band services. Circuitry in the mobile terminal may also be adapted to receive at least a remaining portion of the requested media from a VHF/UHF broadcast service provider providing the broadcast frequency band services.

Circuitry in the mobile terminal may be adapted to receive the cellular frequency band services, which may be provided via global system for mobile communications (GSM), general packet radio service (GPRS), enhanced data rates for GSM evolution (EDGE), code division multiple access 2000 (CDMA2000), wideband CDMA (WCDMA), high speed downlink packet access (HSDPA) systems, and/or multiple broadcast/multicast service (MBMS). The mobile terminal may also comprise circuitry adapted to receive the VHF/UHF broadcast frequency band services, which may be provided via digital video broadcast (DVB), advanced standards technical committee (ATSC), and/or integrated service digital broadcasting (ISDB). Circuitry in the mobile terminal may be adapted to communicate RF channel condition from the mobile terminal to a service provider providing the cellular frequency band services and the VHF/UHF broadcast frequency band services.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention provide a method and system for communicating information via a plurality of different networks. Aspect of the invention may comprise a mobile terminal capable of receiving and processing cellular frequency band services and VHF/UHF broadcast frequency band services. The mobile terminal may comprise a circuit that requests media having a specified quality of service. A user interface in the mobile terminal may be utilized to display a description of the requested media and/or a quality of service associated with the requested media. Circuitry in the mobile terminal may receive an input that indicates at least one required quality of service associated with the requested media. The mobile terminal may comprise memory that stores information that may be utilized to determine at least one required quality of service associated with the requested media. A profile stored in the mobile terminal may store one or more required quality of service associated with the requested media.

Figure 1A:
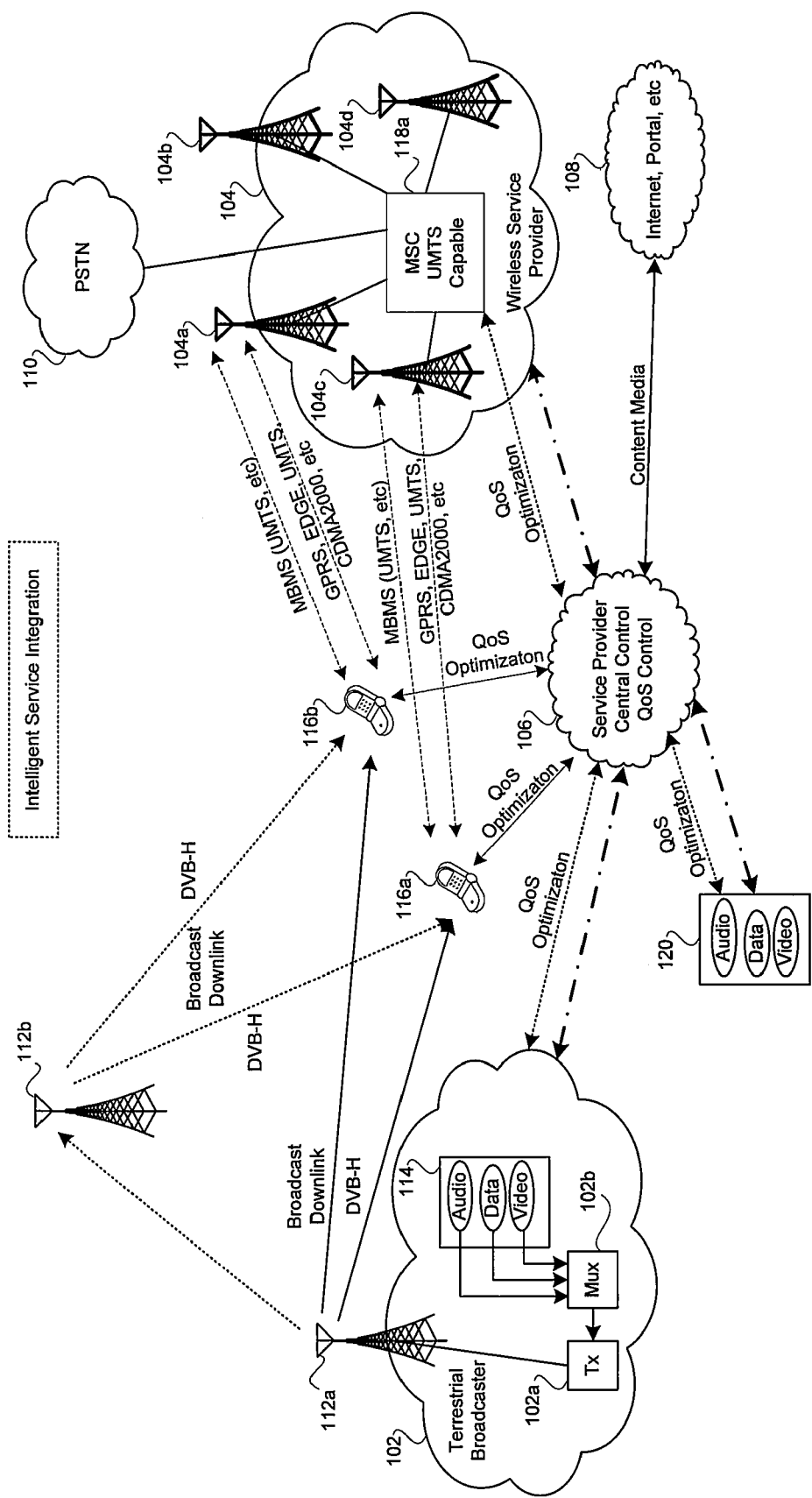
FIG. 1a is a block diagram of an exemplary system for providing integrated services between a cellular network and a digital video broadcast network, in accordance with an embodiment of the invention.

FIG. 1*a* is a block diagram of an exemplary system for providing integrated services between a cellular network and a digital video broadcast network, in accordance with an embodiment of the invention. Referring to FIG. 1*a*, there is shown terrestrial broadcaster network 102, wireless service provider network 104, service provider 106, portal 108, public switched telephone network 110, and mobile terminals (MTs) 116*a* and 116*b*. The terrestrial broadcaster network 102 may comprise transmitter (Tx) 102*a*, multiplexer (Mux) 102*b*, and information content source 114. The content source 114 may also be referred to as a data carousel, which may comprise audio, data and video content. The terrestrial broadcaster network 102 may also comprise VHF/UHF broadcast antennas 112*a* and 112*b*. The wireless service provider network 104 may comprise mobile switching center (MSC) 118*a*, and a plurality of cellular base stations 104*a*, 104*b*, 104*c*, and 104*d*.

The terrestrial broadcaster network 102 may comprise suitable equipment that may be adapted to encode and/or encrypt data for transmission via the transmitter 102*a*. The transmitter 102*a* in the terrestrial broadcast network 102 may be adapted to utilize VHF/UHF broadcast channels to communicate information to the mobile terminals 116*a*, 116*b*. The multiplexer 102*b* associated with the terrestrial broadcaster network 102 may be utilized to multiplex data from a plurality of sources. For example, the multiplexer 102*b* may be adapted to multiplex various types of information such as audio, video and/or data into a single pipe for transmission by the transmitter 102*a*. Content media from the portal 108, which may be handled by the service provider 106 may also be multiplexed by the multiplexer 102*b*. The portal 108 may be an ISP service provider. Although DVB is illustrated as the VHF/UHF standard, the invention is not limited in this regard. Accordingly, ATSC, ISDB or other VHF/UHF standard may be utilized.

In one aspect of the invention, the terrestrial broadcaster network 102 may be adapted to provide one or more digital television (DTV) channels to the service provider 106. In this regard, the terrestrial broadcaster network 102 may comprise suitable high-speed or broadband interfaces that may be utilized to facilitate transfer of the DTV channels from the terrestrial broadcast network 102 to the service provider. The service provider 106 may then utilize at least a portion of the DTV channels to provide television (TV) on demand service, or other similar types of services to the wireless service provider network 104. Accordingly, the service provider 106 may further comprise suitable high-speed or broadband interfaces that may be utilized to facilitate the transfer of related TV on demand information to the MSC 118*a*.

Although communication links between the terrestrial broadcast network 102 and the service provider 106, and also the communication links between the service provider 106 and the wireless service provider 104 may be wired communication links, the invention may be not so limited. Accordingly, at least one of these communication links may be wireless communication links. In an exemplary embodiment of the invention, at least one of these communication links may be an 802. x based communication link such as 802.16 or WiMax broadband access communication link. In another exemplary embodiment of the invention, at least one of these connections may be a broadband line of sight (LOS) connection.

The wireless service provider network 104 may be a cellular or personal communication service (PCS) provider that may be adapted to handle broadcast UMTS (B-UMTS). The term cellular as utilized herein refers to both cellular and PCS frequencies bands. Hence, usage of the term cellular may comprise any band of frequencies that may be utilized for cellular communication and/or any band of frequencies that may be utilized for PCS communication. Notwithstanding, broadcast UMTS (B-UMTS) may also be referred to as MBMS. MBMS is a high-speed data service that is overlaid on WCDMA to provide much higher data rates than may be provided by core WCDMA. In this regard, the B-UMTS services may be superimposed on the cellular or PCS network.

The wireless service provider network 104 may utilize cellular or PCS access technologies such as GSM, CDMA, CDMA2000, WCDMA, AMPS, N-AMPS, and/or TDMA. The cellular network may be utilized to offer bi-directional services via uplink and downlink communication channels, while the B-UMTS or MBMS network may be utilized to provide a unidirectional broadband services via a downlink channel. The B-UMTS or MBMS unidirectional downlink channel may be utilized to broadcast content media and/or multimedia type information to the mobile terminals 116*a* and 116b. Although MBMS provides only unidirectional downlink communication, the invention may be not so limited. In this regard, other bidirectional communication methodologies comprising uplink and downlink capabilities, whether symmetric or asymmetric, may be utilized.

Although the wireless service provider network 104 is illustrated as a GSM, CDMA, WCDMA based network and/or variants thereof, the invention is not limited in this regard. Accordingly, the wireless service provider network 104 may be an 802.11 based wireless network or wireless local area network (WLAN). The wireless service provider network 104 may also be adapted to provide 802.11 based wireless communication in addition to GSM, CDMA, WCDMA, CDMA2000 based network and/or variants thereof. In this case, the mobile terminals 116a, 116b may also be compliant with the 802.11 based wireless network.

In accordance with an exemplary embodiment of the invention, if the mobile terminal (MT) 116a is within an operating range of the VHF/UHF broadcasting antenna 112a and moves out of the latter's operating range and into an operating range of the VHF/UHF broadcasting antenna 112b, then VHF/UHF broadcasting antenna 112b may be adapted to provide VHF/UHF broadcast services to the mobile terminal 116a. If the mobile terminal 116a subsequently moves back into the operating range of the VHF/UHF broadcasting antenna 112a, then the broadcasting antenna 112a may be adapted to provide VHF/UHF broadcasting service to the mobile terminal 116a. In a somewhat similar manner, if the mobile terminal (MT) 116b is within an operating range of the VHF/UHF broadcasting antenna 112b and moves out of the latter's operating range and into an operating range of the broadcasting antenna 112a, then the VHF/UHF broadcasting antenna 112a may be adapted to provide VHF/UHF broadcasting service to the mobile terminal 116b. If the mobile terminal 116b subsequently moves back into the operating range of broadcasting antenna 112b, then the VHF/UHF broadcasting antenna 112b may be adapted to provide VHF/UHF broadcast services to the mobile terminal 116b.

The service provider 106 may comprise suitable interfaces, circuitry, logic and/or code that may be adapted to facilitate communication between the terrestrial broadcasting network 102 and the wireless communication network 104. In an illustrative embodiment of the invention the service provider 106 may be adapted to utilize its interfaces to facilitate exchange control information with the terrestrial broadcast network 102 and to exchange control information with the wireless service provider 104. The control information exchanged by the service provider 106 with the terrestrial broadcasting network 102 and the wireless communication network 104 may be utilized to control certain operations of the mobile terminals, the terrestrial broadcast network 102 and the wireless communication network 104.

In accordance with an embodiment of the invention, the service provider 106 may also comprise suitable interfaces, circuitry, logic and/or code that may be adapted to handle network policy decisions. For example, the service provider 106 may be adapted to manage a load on the terrestrial broadcast network 102 and/or a load on the wireless service provider network 104. Load management may be utilized to distribute the flow of information throughout the terrestrial broadcast network 102 and/or a load on the wireless service provider network 104. For example, if information is to be broadcasted via the wireless service provider network 104 to a plurality of mobile terminals within a particular cell handled by the base station 104a and it is determined that this may overload the wireless service provider network 104, then the terrestrial broadcast network 102 may be configured to broadcast the information to the mobile terminals.

The service provider 106 may also be adapted to handle certain types of service requests, which may have originated from a mobile terminal. For example, the mobile terminal 116a may request that information be delivered to it via a downlink VHF/UHF broadcast channel. However, a downlink VHF/UHF broadcast channel may be unavailable for the delivery of the requested information. As a result, the service provider 106 may route the requested information through an MBMS channel via the base station 104c to the mobile terminal 116a. The requested information may be acquired from the content source 114 and/or the portal 108. In another example, the mobile terminal 116b may request that information be delivered to it via a downlink cellular channel. However, the service provider 106 may determine that delivery of the information is not critical and/or the cheapest way to deliver to the mobile terminal 116b is via a downlink VHF/UHF broadcast channel. As a result, the service provider 106 may route the requested information from the portal 108 or content service 114 to the mobile terminal 116b. The service provider 106 may also have the capability to send at least a portion of information to be delivered to, for example, mobile terminal 116a via the VHF/UHF broadcast channel and a remaining portion of the information to be delivered via the cellular broadcast channel.

In an embodiment of the invention, the service provider 106 may be adapted to receive and process quality of service (QoS) related information from the mobile terminals 116a, 116b, the wireless service provider 104 and/or the broadcast service provider. In an embodiment of the invention, any one of the mobile terminals 116a, 116b may request that information have a certain QoS be delivered to via a specified part or any part that may have to capability to supply the requested information.

In another embodiment of the invention, the service provider 106 may be adapted to autonomously control the QoS that is provided to the mobile terminal 116a and 116b. In this regard, the service provider 106 may be adapted to monitor, for example, condition on link that may be utilized to communicate with the mobile terminals 116a, and 116b. For example, the service provider 106 may be request information related to RF channel conditions from each of the mobile terminals 116a, 116b, the wireless service provider 104 and/or the broadcast service provider 102.

The service provider 106 may also be adapted to acquire information regarding a load on the terrestrial broadcast network 102 and a load on the wireless service provider network 104. Accordingly, based on the determined load, the service provider 106 may be adapted to control how data may be routed over the terrestrial broadcast network 102 and/or the wireless service provider network 104 to utilizing QoS related information. For example, if the service provider 106 determines that the wireless service provider 104 is congested, then most of the requested information that is to be delivered to the mobile terminal 116a may be delivered via the terrestrial broadcast service provider 102. If the service provider 106 determines that the terrestrial broadcast service provider 102 is congested, then most of the requested information that is to be delivered to the mobile terminal 116a may be delivered via the wireless service provider 104. The service provider 106 may also be adapted to partition delivery of requested information to the mobile terminal 116a. In this regard, based on a load on the wireless service provider 104 and the terrestrial service provider 102, a portion of requested information may be routed through the wireless service provider 104 to the mobile terminal 116a and at least a remaining portion of the requested information may be routed through the terrestrial service provider 102 to the mobile terminal 116*a*.

The portal 108 may comprise suitable logic, circuitry and/or code that may be adapted to provide content media to the service provider 106 via one or more communication links. These communication links, although not shown, may comprise wired and/or wireless communication links. The content media that may be provided by the portal 108 may comprise audio, data, video or any combination thereof. In this regard, the portal 108 may be adapted to provide one or more specialized information services to the service provider 106.

The public switched telephone network (PSTN) 110 may be coupled to the MSC 118*a*. Accordingly, the MSC 118*a* may be adapted to switch calls originating from within the PSTN 110 to one or more mobile terminals serviced by the wireless service provider 104. Similarly, the MSC 118*a* may be adapted to switch calls originating from mobile terminals serviced by the wireless service provider 104 to one or more telephones serviced by the PSTN 110.

The information content source 114 may comprise a data carousel. In this regard, the information content source 114 may be adapted to provide various information services, which may comprise online data including audio, video and data content. The information content source 114 may also comprise file download, and software download capabilities. In instances where a mobile terminal fails to acquire requested information from the information content source 114 or the requested information is unavailable, then the mobile terminal may acquire the requested information via, for example, a B-UMTS from the portal 108. The request may be initiated through an uplink cellular communication path.

The mobile terminals (MTs) 116*a* and 116*b* may comprise suitable logic, circuitry and/or code that may be adapted to handle the processing of uplink and downlink cellular channels for various access technologies and broadcast VHF/UHF technologies. In an exemplary embodiment of the invention, the mobile terminals 116*a*, 116*b* may be adapted to utilize one or more cellular access technologies such as GSM, GPRS, EDGE, CDMA, WCDMA, CDMA2000, HSDPA and MBMS (B-UMTS). The mobile terminal may also be adapted to receive and process VHF/UHF broadcast signals in the VHF/UHF bands. For example, a mobile terminal may be adapted to receive and process DVB-H signals. A mobile terminal may be adapted to request information via a first cellular service and in response, receive corresponding information via a VHF/UHF broadcast service. A mobile terminal may also be adapted to request information from a service provider via a cellular service and in response, receive corresponding information via a data service, which is provided via the cellular service. The mobile terminals may also be adapted to receive VHF/UHF broadcast information from either the base stations 104*a*, 104*b*, 104*c*, 104*d* or the VHF/UHF broadcast antennas 112*a* and 112*b*. In instances where a mobile terminal receives broadcast information from any of the base stations 104*a*, 104*b*, 104*c*, or 104*d* via a downlink MBMS communication channel, then the mobile terminal may communicate corresponding uplink information via an uplink cellular communication channel.

In one embodiment of the invention, a mobile terminal may be adapted to utilize a plurality of broadcast integrated circuits for receiving and processing VHF/UHF channels, and a plurality of cellular integrated circuits for receiving and processing cellular or PCS channels. In this regard, the plurality of cellular integrated circuits may be adapted to handle different cellular access technologies. For example, at least one of the cellular integrated circuits may be adapted to handle GSM, and at least one of the cellular integrated circuits may be adapted to handle WCDMA. For broadcast channels, each of the plurality of broadcast integrated circuits may be adapted to handle at least one VH/UHF channel.

In another embodiment of the invention, a mobile terminal may be adapted to utilize a single broadcast integrated circuit for receiving and processing VHF/UHF channels, and a single cellular integrated circuit for receiving and processing cellular or PCS channels. In this regard, the single cellular integrated circuit may be adapted to handle different cellular access technologies. For example, at least one of the cellular integrated circuit may be adapted to handle GSM, and at least one of the cellular integrated circuits may be adapted to handle WCDMA. For broadcast channels, the single broadcast integrated circuit may be adapted to handle at least one VH/UHF channel. Each of the mobile terminals may comprise a single memory interface that may be adapted to handle processing of the broadcast communication information and processing of cellular communication information. In this regard, an uplink cellular communication path may be utilized to facilitate receiving of broadcast information via a broadcast communication path.

In another embodiment of the invention, a mobile terminal may be adapted to utilize a single integrated circuit for receiving and processing broadcast VHF/UHF channels, and for receiving and processing cellular or PCS channels. In this regard, the single broadcast and cellular integrated circuit may be adapted to handle different cellular access technologies. For example, the single integrated circuit may comprise a plurality of modules each of which may be adapted to receive and process a particular cellular access technology or a VHF/UHF broadcast channel. Accordingly, a first module may be adapted to handle GSM, a second module may be adapted to handle WCDMA, and a third module may be adapted to handle at least one VHF/UHF channel.

In operation, with reference to FIG. 1*a*, a mobile terminal 116*a* may request service via a wireless service provider network 104 with specified quality of service (QoS) criteria. The service provider network 106 may take the QoS request into consideration in determining how to establish the service to the mobile terminal 116*a*. The mobile terminal 116*a* may establish a communication to a service provider 106 via the wireless service provider network 104. The mobile terminal 116*a* may request content from the service provider 106 via the wireless service provider network 104. The service provider 106 may determine the QoS required to deliver the program to the mobile terminal 116*a*. If the service provider 106 determines that the QoS requirements to deliver the content to the mobile terminal 116*a* cannot be met via the wireless service provider network 104, the content may be delivered via the terrestrial broadcast network 102.

Upon determining that the program content is to be delivered via the terrestrial broadcast network 102, the service provider 106 may send a request to the terrestrial broadcast network 102 to communicate the content requested by the mobile terminal 116*a*. The terrestrial broadcast network 102 may reply to the service provider 106 indicating a VHF/UHF channel assignment, which may be utilized to broadcast the content. The service provider 106 may communicate to the mobile terminal 116*a* via the wireless service provider network 104 indicating that the desired content will be delivered via the terrestrial broadcast network 102 via the assigned VHF/UHF channel. The service provider 106 may initiate transfer of content to the terrestrial broadcast network 102. The mobile terminal 116*a*, may select the assigned VHF/UHF broadcast channel and begin reception of the content requested by the mobile terminal 116*a*. The mobile terminal 116a may terminate communication with the service provider 106 via the wireless service provider network 104.

Figure 1B:
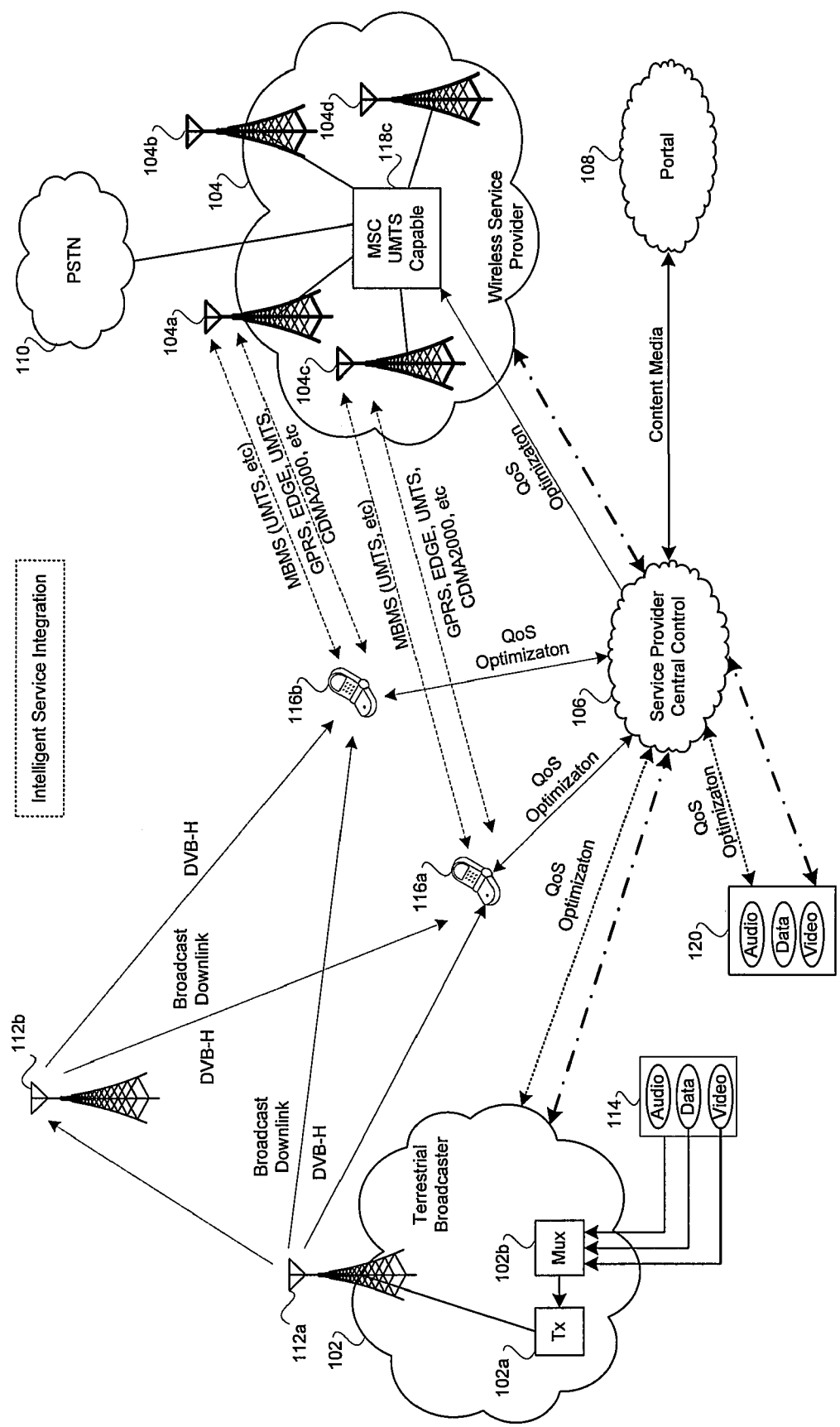
FIG. 1b is a block diagram of an alternative embodiment of the exemplary system of FIG. 1a for providing integrated services between a cellular network and a digital video broadcast network, in accordance with an embodiment of the invention.

FIG. 1b is a block diagram of an alternative embodiment of the exemplary system of FIG. 1a for providing integrated services between a cellular network and a digital video broadcast network, in accordance with an embodiment of the invention. Referring to FIG. 1b, there is shown terrestrial broadcaster network 102, wireless service provider network 104, service provider 106, portal 108, public switched telephone network 110, and mobile terminals (MTs) 116a and 116b. The terrestrial broadcaster network 102 may comprise transmitter (Tx) 102a, multiplexer (Mux) 102b, and VHF/UHF broadcast antennas 112a and 112b. Although VHF/UHF broadcast antenna 112b is illustrated separately from the terrestrial broadcast network 102, it may still be part of the terrestrial broadcast network 102. The wireless service provider network 104 may comprise mobile switching center (MSC) 118a, and a plurality of cellular base stations 104a, 104b, 104c, and 104d.

The system of FIG. 1b is somewhat similar to the FIG. 1a with the exception that FIG. 1b has the content source 114 located external to the terrestrial broadcast network 102. The content source 114, which may also be referred to as a data carousel, may comprise audio, data and video content. At least a portion of the audio, data and/or video content stored in the content source 114 may be linked so that if information cannot be retrieved from the content source 114, then it may be received from the portal 108. In the system of FIG. 1b, a provider other than the terrestrial broadcaster 102 may manage the content source 114. Notwithstanding, the audio, video and/or data from the content source 114 may still be multiplexed by the multiplexer 102b in the terrestrial broadcast network 114.

Figure 1C:
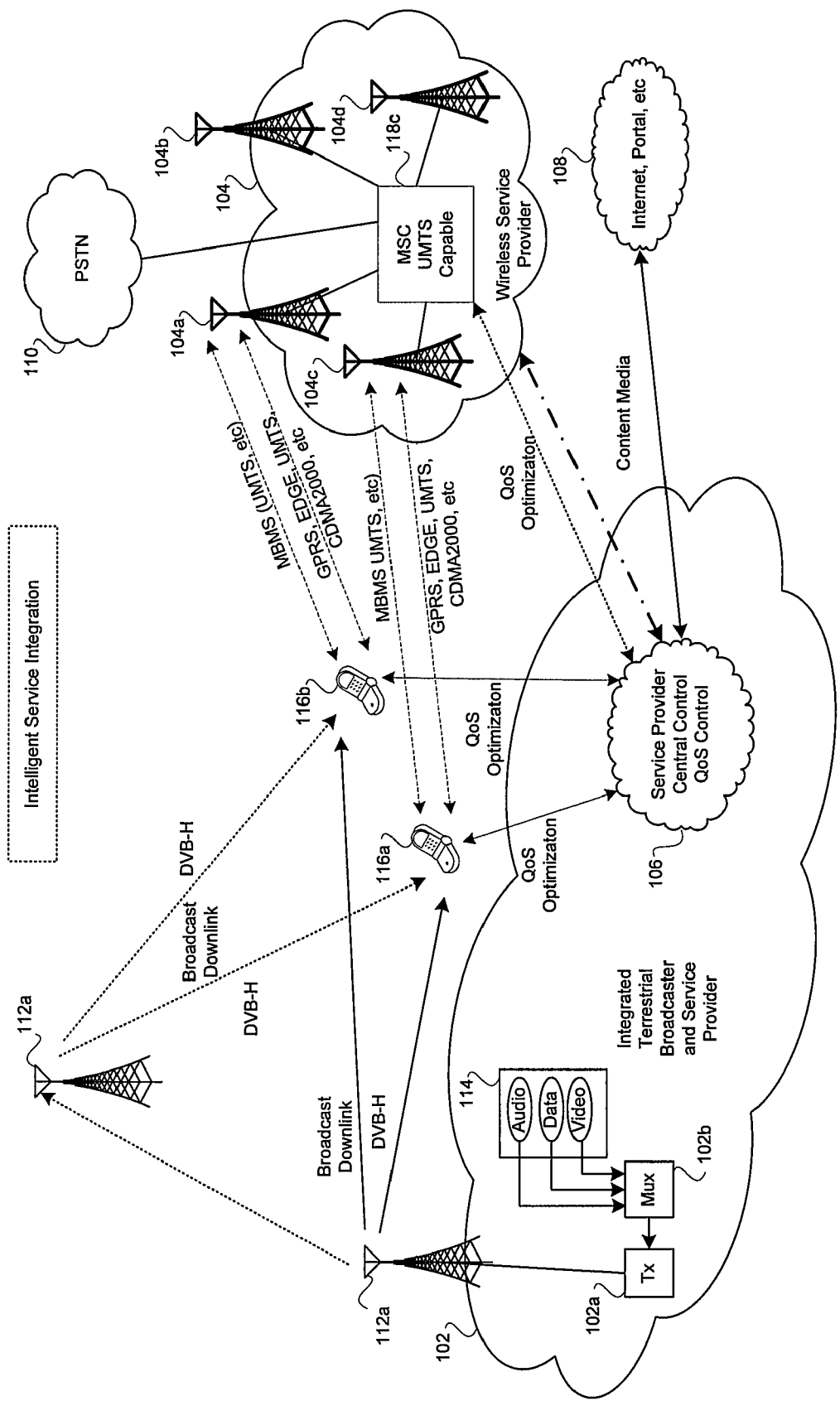
FIG. 1c is a block diagram of an alternative embodiment of the exemplary system of FIG. 1a for providing integrated services between a cellular network and a digital video broadcast network, in accordance with an embodiment of the invention.

FIG. 1c is a block diagram of an alternative embodiment of the exemplary system of FIG. 1a for providing integrated services between a cellular network and a digital video broadcast network, in accordance with an embodiment of the invention. Referring to FIG. 1c, there is shown terrestrial broadcaster network 102, wireless service provider network 104, portal 108, public switched telephone network 110, and mobile terminals (MTs) 116a and 116b. The terrestrial broadcaster network 102 may comprise transmitter (Tx) 102a, multiplexer (Mux) 102b, service provider 106, and VHF/UHF broadcast antennas 112a and 112b. The wireless service provider network 104 may comprise mobile switching center (MSC) 118a, and a plurality of cellular base stations 104a, 104b, 104c, and 104d.

The system of FIG. 1c is somewhat similar to the FIG. 1a with the exception that FIG. 1b has the service provider 106 co-located with the terrestrial broadcast network 102. In this regard, the terrestrial broadcast network 102 may control the functions of the service provider 106. Since the terrestrial broadcast network 102 controls the functions of the service provider, the broadcast services may be more efficiently provided to the mobile terminals via the MBMS path provided by the wireless service provider 104 and/or the VHF/UHF broadcast downlink path provided by the terrestrial broadcaster network 102. Hence, instead of having to send information to an externally located service provider, the integrated control and logic services provided the terrestrial broadcaster network 102 and service provider 106 may instantly make decisions of how best to handle information for a mobile terminal.

Figure 1D:
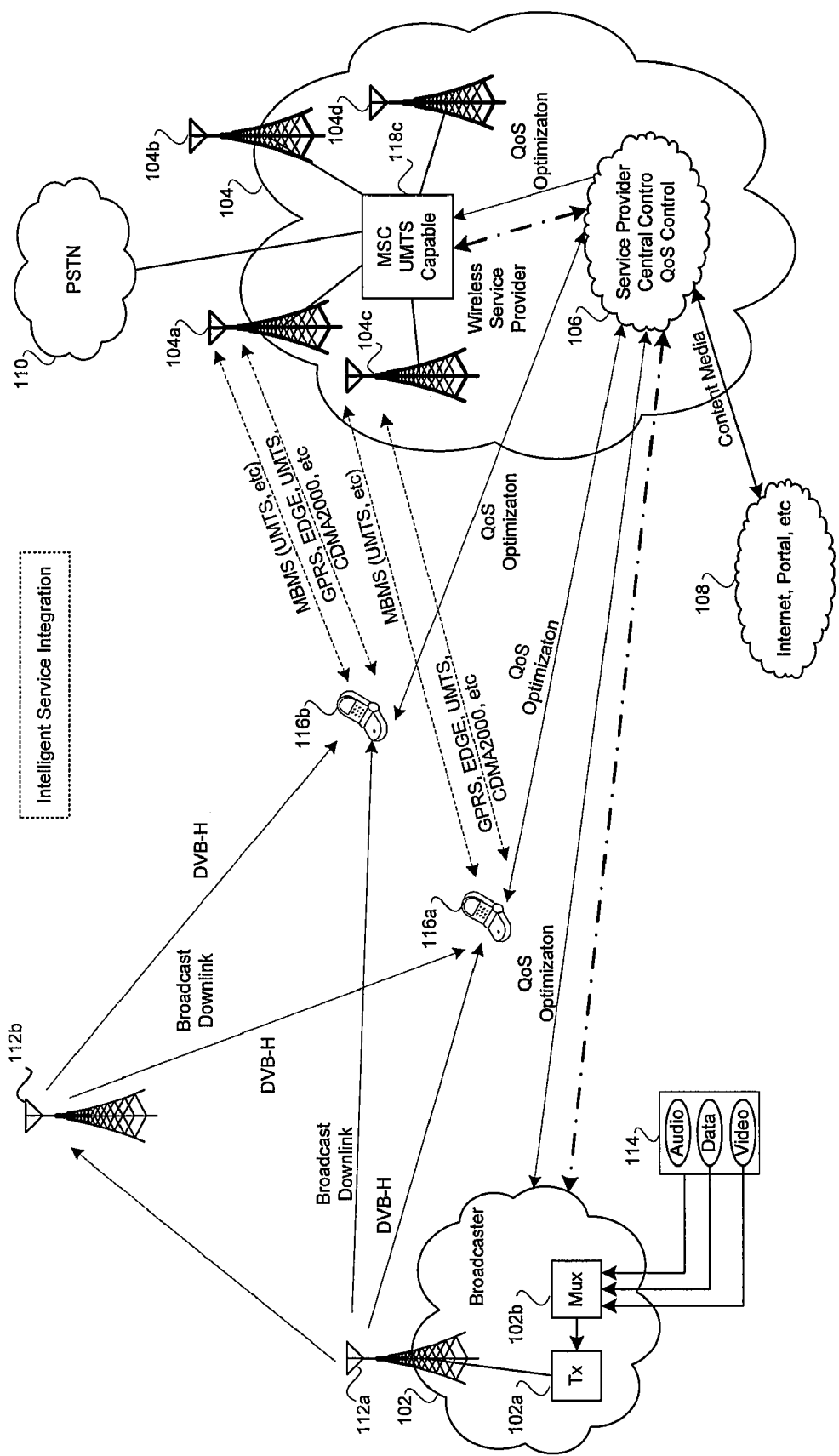
FIG. 1d is a block diagram of an alternative embodiment of the exemplary system of FIG. 1a for providing integrated services between a cellular network and a digital video broadcast network, in accordance with an embodiment of the invention.

FIG. 1d is a block diagram of an alternative embodiment of the exemplary system of FIG. 1a for providing integrated services between a cellular network and a digital video broadcast network, in accordance with an embodiment of the invention. Referring to FIG. 1d, there is shown terrestrial broadcaster network 102, wireless service provider network 104, portal 108, public switched telephone network 110, and mobile terminals (MTs) 116a and 116b. The terrestrial broadcaster network 102 may comprise transmitter (Tx) 102a, multiplexer (Mux) 102b, and VHF/UHF broadcast antennas 112a and 112b. The wireless service provider network 104 may comprise service provider 106, mobile switching center (MSC) 118a, and a plurality of cellular base stations 104a, 104b, 104c, and 104d.

The system of FIG. 1d is somewhat similar to the FIG. 1a with the exception that FIG. 1b has the service provider 106 co-located with the wireless service provider network 104. In this regard, the wireless service provider network 104 may control the functions of the service provider 106. Since the wireless service provider network 104 controls the functions of the service provider 106, the broadcast services may be more efficiently provided to the mobile terminals via the MBMS path provided by the wireless service provider 104 and/or the VHF/UHF broadcast downlink path provided by the terrestrial broadcaster network 102. Hence, instead of having to send information to an externally located service provider 106 as illustrated in FIG. 1a, the integrated control and logic services provided the service provider 106 may instantly make decisions of how best to handle communication of information for a mobile terminal.

In another embodiment of the invention, since many of the services provided by the service provider 106 may already be integrated into the wireless service provider's 104 infrastructure, then the complexity of the service provider functions may be significantly reduced. For example, the wireless service provider 104, the latter of which already has the pertinent infrastructure in place, may now handle operation administration maintenance and provisioning (OAM&P) functions, which may be required by the service provider 106. Since the uplink capabilities are inherent in only the wireless service provider network 104, and the service provider function are also located within the service provider network 106, the uplink capabilities for the mobile stations 116a, 116b may be more efficiently managed from within the wireless service provider network 104.

Figure 1E:
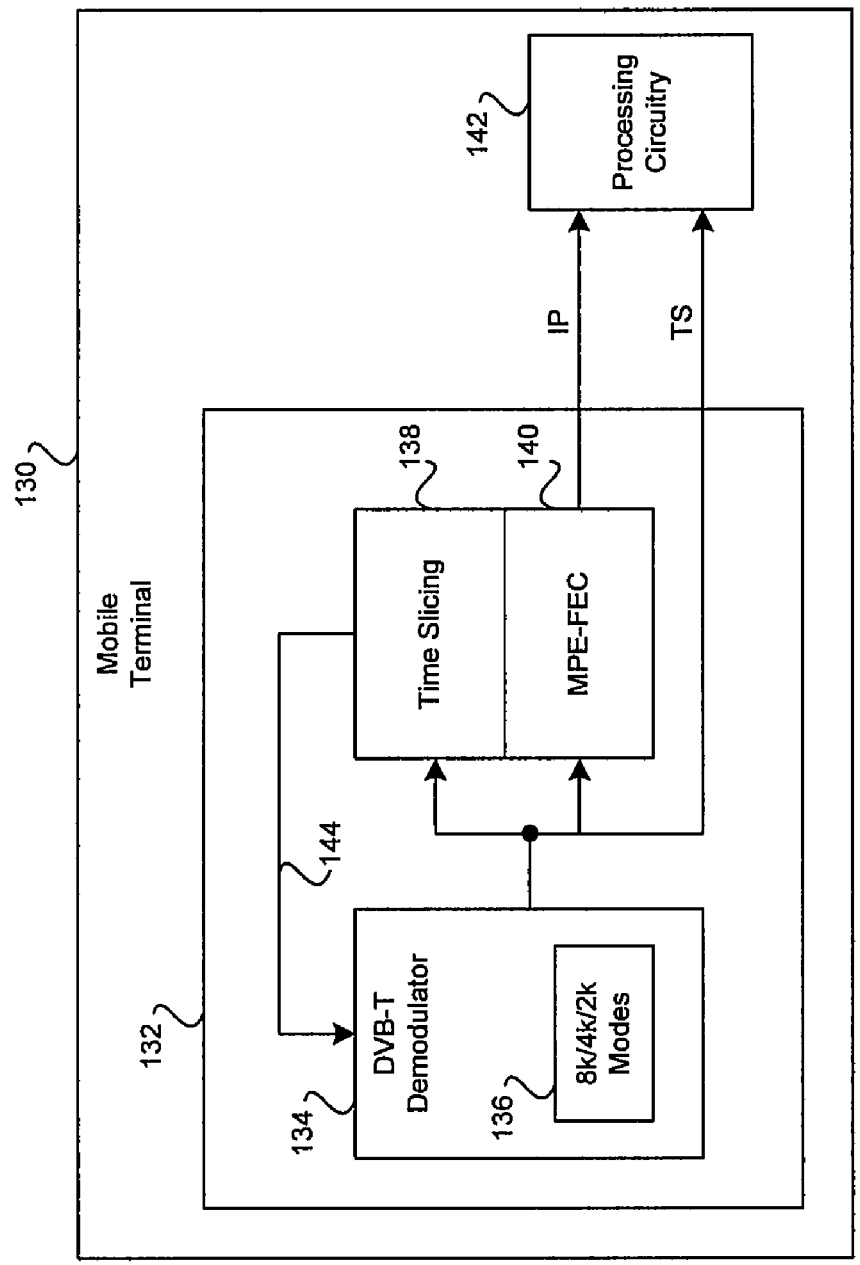
FIG. 1e is a high-level block diagram of exemplary DVB-H receiver circuitry in a mobile terminal, which may be utilized in connection with an embodiment of the invention.

FIG. 1e is a high-level block diagram of exemplary DVB-H receiver circuitry in a mobile terminal, which may be utilized in connection with an embodiment of the invention. Referring to FIG. 1e, there is shown a mobile terminal 130. The mobile terminal 130 may comprise a DVB-H demodulator 132 and processing circuitry block 142. The DVB-H demodulator block 132 may comprise a DVB-T demodulator 134, time slicing block 138, and MPE-FEC block 140.

The DVB-T demodulator 134 may comprise suitable circuitry, logic and/or code that may be adapted to demodulate a terrestrial DVB signal. In this regard, the DVB-T demodulator 134 may be adapted to downconvert a received DVB-T signal to a suitable bit rate that may be handled by the mobile terminal 130. The DVB-T demodulator may be adapted to handle 2 k, 4 k and/or 8 k modes.

The time slicing block 138 may comprise suitable circuitry, logic and/or code that may be adapted to minimize power consumption in the mobile terminal 130, particularly in the DVB-T demodulator 134. In general, time slicing reduces average power consumption in the mobile terminal by sending data in bursts via much higher instantaneous bit rates. In order to inform the DVB-T demodulator 134 when a next burst is going to be sent, a delta indicating the start of the next burst is transmitted within a current burst. During transmission, no data for an elementary stream (ES) is transmitted so as to allow other elementary streams to optimally share the bandwidth. Since the DVB-T demodulator 134 knows when the next burst will be received, the DVB-T demodulator 134 may enter a power saving mode between bursts in order to consume less power. Reference 144 indicates a control mechanism that handles the DVB-T demodulator 134 power via the time slicing block 138. The DVB-T demodulator 134 may also be adapted to utilize time slicing to monitor different transport streams from different channels. For example, the DVB-T demodulator 134 may utilize time slicing to monitor neighboring channels between bursts to optimize handover.

The MPE-FEC block 140 may comprise suitable circuitry, logic and/or code that may be adapted to provide error correction during decoding. On the encoding side, MPE-FEC encoding provides improved carrier to noise ratio (C/N), improved Doppler performance, and improved tolerance to interference resulting from impulse noise. During decoding, the MPE-FEC block 140 may be adapted to determine parity information from previously MPE-FEC encoded datagrams. As a result, during decoding, the MPE-FEC block 140 may generate datagrams that are error-free even in instances when received channel conditions are poor. The processing circuitry block 142 may comprise suitable processor, circuitry, logic and/or code that may be adapted to process IP datagrams generated from an output of the MPE-FEC block 140. The processing circuitry block 142 may also be adapted to process transport stream packets from the DVB-T demodulator 134.

In operation, the DVB-T demodulator 134 may be adapted to receive an input DVB-T RF signal, demodulate the received input DVB-T RF signal so as to generate data at a much lower bit rate. In this regard, the DVB-T demodulator 134 recovers MPEG-2 transport stream (TS) packets from the input DVB-T RF signal. The MPE-FEC block 140 may then correct any error that may be located in the data and the resulting IP datagrams may be sent to the processing circuitry block 142 for processing. Transport stream packets from the DVB-T demodulator 134 may also be communicated to the processing circuitry block 142 for processing.

Figure 1F:
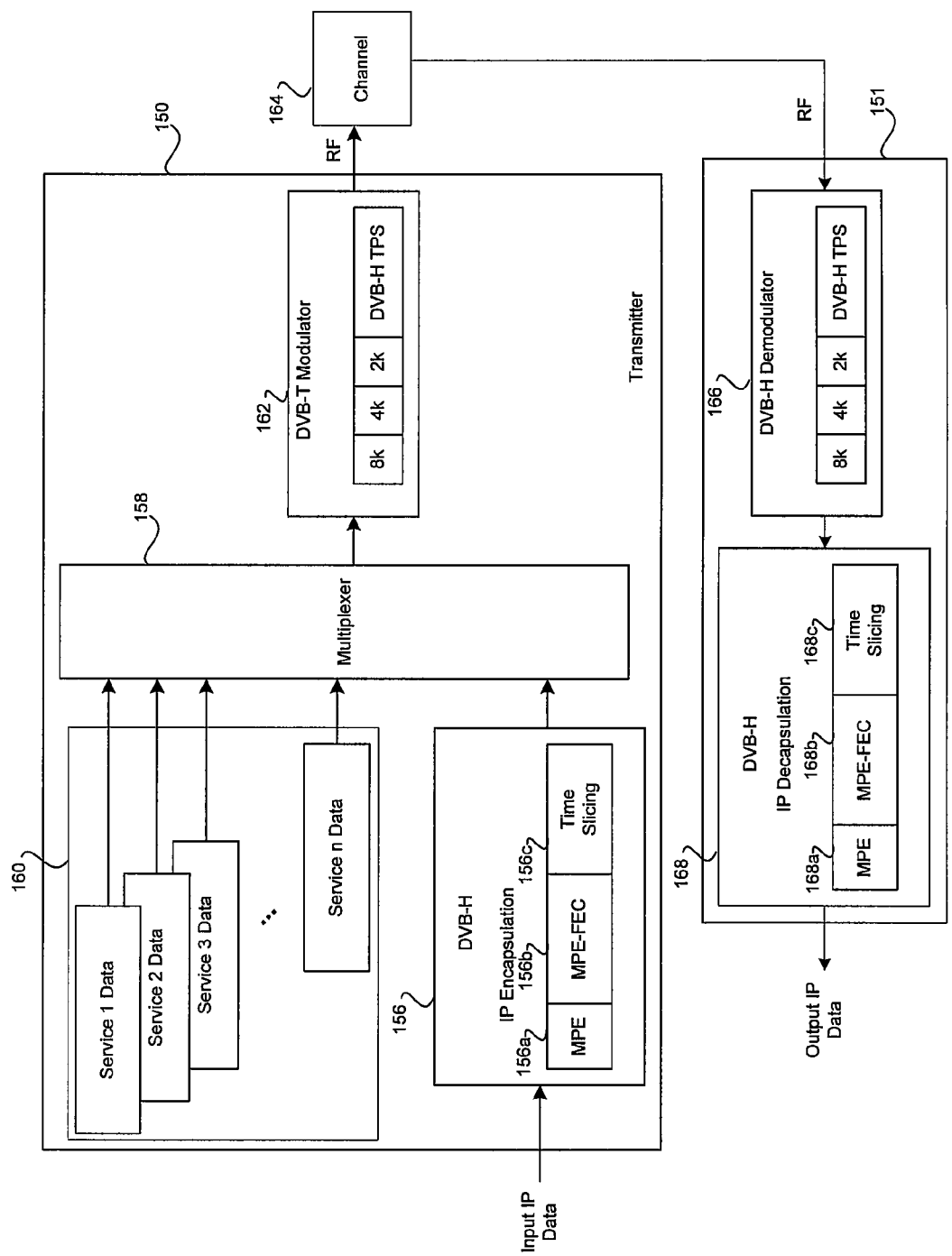
FIG. 1*f* is a block diagram illustrating the sharing of a multiplexer (MUX) by a plurality of MPEG2 services, which may be utilized in connection with an embodiment of the invention.

FIG. 1f is a block diagram illustrating the sharing of a multiplexer (MUX) by a plurality of MPEG2 services, which may be utilized in connection with an embodiment of the invention. Referring to FIG. 1f, there is shown a transmitter block 150, a receiver block 151 and a channel 164. The transmitter block 150 may comprise a DVB-H encapsulator block 156, a multiplexer 158, and a DVB-T modulator 162. Also shown associated with the transmitter block 150 is a plurality of service data collectively referenced as 160. The receiver block 151 may comprise a DVB-H demodulator block 166 and a DVB-H decapsulation block 168.

The DVB-H encapsulator block 156 may comprise MPE block 156a, MPE-FEC block 156b and time slicing block 156c.

The multiplexer 156 may comprise suitable logic circuitry and/or code that may be adapted to handle multiplexing of IP encapsulated DVB-H data and service data. The plurality of service data collectively referenced as 160 may comprise MPEG-2 formatted data, which may comprise for example, audio, video and/or data.

The DVB-T modulator 162 may comprise suitable logic circuitry and/or code that may be adapted to generate an output RF signal from the transmitter block 150.

The DVB-H demodulator block 166 associated with the receiver block 151 is similar to the DVB-H demodulator block 132 of FIG. 1e. The DVB-H decapsulation block 168 may comprise MPE block 168a, MPE-FEC block 168b and time slicing block 168c. The DVB-H decapsulation block 168 may comprise suitable logic, circuitry and/or code that may be adapted decapsulate the IP data that was encapsulated and multiplexed by the transmitter block 150. The output of the DVB-H demodulator 166 is the transport stream packets, which comprised the multiplexed output generated by the multiplexer 158.

Figure 2A:
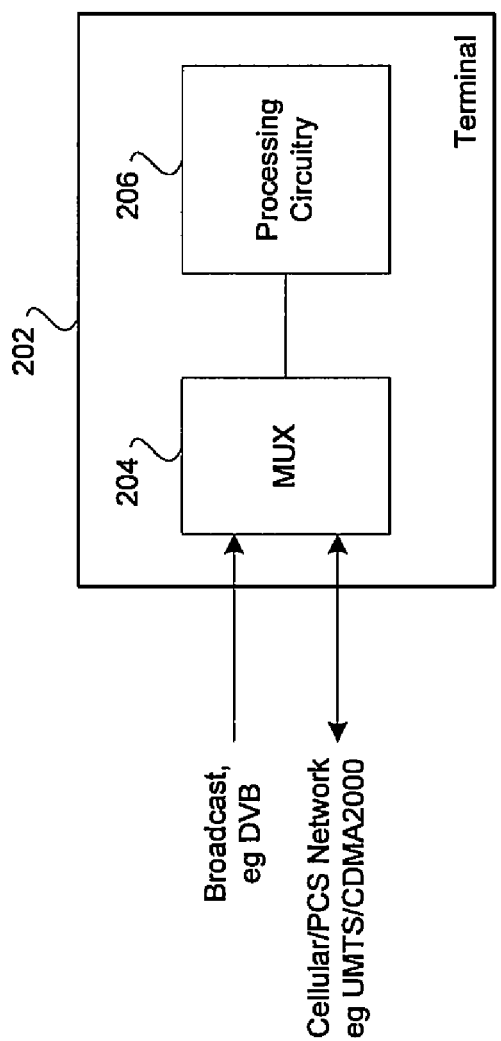
FIG. 2*a* is a block diagram of a mobile terminal that is adapted to receive VHF/UHF broadcasts and cellular communications, in accordance with an embodiment of the invention.

FIG. 2a is a block diagram of a mobile terminal that is adapted to receive VHF/UHF broadcasts and cellular communications, in accordance with an embodiment of the invention. Referring to FIG. 2a, there is shown mobile terminal (MT) or handset 202. The mobile terminal 202 may comprise multiplexer (MUX) 204 and processing circuitry 206.

The multiplexer 204 may comprise suitable logic circuitry and/or code that may be adapted to multiplex incoming signals, which may comprise VHF/UHF broadcast channel and at least one cellular channel. The cellular channel may be within the range of both cellular and PCS frequency bands.

The processing circuitry 206 may comprise, for example, an RF integrated circuit (RFIC) or RF front end (RFFE). In this regard, the processing circuitry 206 may comprise at least one receiver front end (RFE) circuit. A first of these circuits may be adapted to handle processing of the VHF/UHF broadcast channel and a second of these circuits may be adapted to handle a cellular channel. In an embodiment of the invention, a single RFIC may comprise a plurality of RFE processing circuits, each of which may be adapted to process a particular cellular channel. Accordingly, a single RFIC comprising a plurality of cellular RFE processing circuits may be adapted to handle a plurality of cellular channels. In one embodiment of the invention, a plurality of VHF/UHF RFE processing circuits may be integrated in a single RFIC. In this regard, a mobile terminal may be adapted to simultaneously handle a plurality of different VHF/UHF channels. For example, a mobile terminal may be adapted to simultaneously receive a first VHF/UHF channel bearing video and a second VHF/UHF channel bearing audio.

Figure 2B:
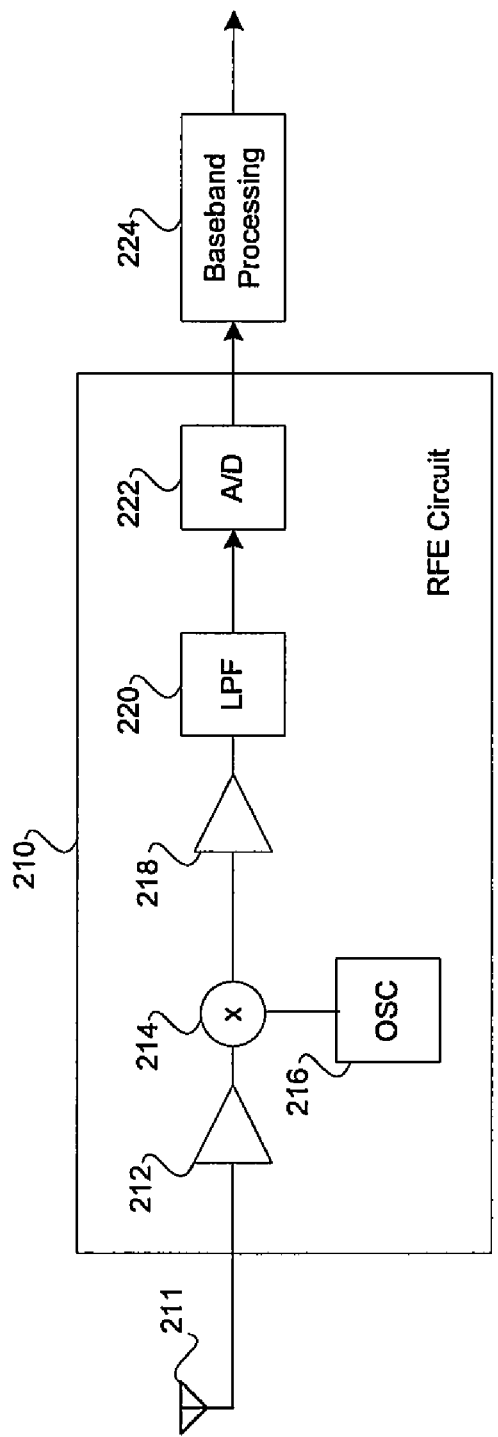
FIG. 2*b* is a block diagram illustrating receive processing circuit of an RF integrated circuit (RFIC), in accordance with an embodiment of the invention.

FIG. 2b is a block diagram illustrating receive processing circuit of an RF integrated circuit (RFIC), in accordance with an embodiment of the invention. Referring to FIG. 2b, there is shown antenna 211, receiver front end (RFE) circuit 210, and baseband processing block 224. The receiver front end (RFE) circuit 210 may comprise a low noise amplifier (LNA) 212, a mixer 214, an oscillator 216, a low noise amplifier or amplifier or amplifier 218, a low pass filter 220 and an analog-to-digital converter (A/D) 222.

The antenna 211 may be adapted to receive at least one of a plurality of signals. For example, the antenna 211 may be adapted to receive a plurality of signals in the GSM band, a plurality of signals in the WCDMA and/or a plurality of signals in the VHF/UHF band. U.S. patent application Ser. No. 11/010,833, U.S. patent application Ser. No. 11/011,006, U.S. patent application Ser. No. 11/010,487, all of which are filed on even date herewith and disclose various antenna configurations that may be utilized for a plurality of operating frequency bands.

The receiver front end (RFE) circuit 210 may comprise suitable circuitry, logic and/or code that may be adapted to convert a received RF signal down to baseband. An input of the low noise amplifier 212 may be coupled to the antenna 211 so that it may receive RF signals from the antenna 211. The low noise amplifier 212 may comprise suitable logic, circuitry, and/or code that may be adapted to receive an input RF signal from the antenna 211 and amplify the received RF signal in such a manner that an output signal generated by the low noise amplifier 212 has a very little additional noise.

The mixer 214 in the RFE circuit 210 may comprise suitable circuitry and/or logic that may be adapted to mix an output of the low noise amplifier 212 with an oscillator signal generated by the oscillator 216. The oscillator 216 may comprise suitable circuitry and/or logic that may be adapted to provide a oscillating signal that may be adapted to mix the output signal generated from the output of the low noise amplifier 212 down to a baseband. The low noise amplifier (LNA) or amplifier 218 may comprise suitable circuitry and/or logic that may be adapted to low noise amplify and output signal generated by the mixer 214. An output of the low noise amplifier or amplifier 218 may be communicated to the low pass filter 220. The low pass filter 220 may comprise suitable logic, circuitry and/or code that may be adapted to low pass filter the output signal generated from the output of the low noise amplifier 220. The low pass filter block 220 retains a desired signal and filters out unwanted signal components such as higher signal components comprising noise. An output of the low pass filter 220 may be communicated to the analog-digital-converter for processing.

The analog-to-digital converter (A/D) 222 may comprise suitable logic, circuitry and/or code that may be adapted to convert the analog signal generated from the output of the low pass filter 220 to a digital signal. The analog-to-digital converter 222 may generate a sampled digital representation of the low pass filtered signal that may be communicated to the baseband-processing block 224 for processing. The baseband processing block 224 may comprise suitable logic, circuitry and/or code that may be adapted to process digital baseband signals received from an output of the A/D 222. Although the A/D 222 is illustrated as part of the RFE circuit 210, the invention may not be so limited. Accordingly, the A/D 222 may be integrated as part of the baseband processing block 224. In operation, the RFE circuit 210 is adapted to receive RF signals via antenna 211 and convert the received RF signals to a sampled digital representation, which may be communicated to the baseband processing block 224 for processing.

Figure 2C:
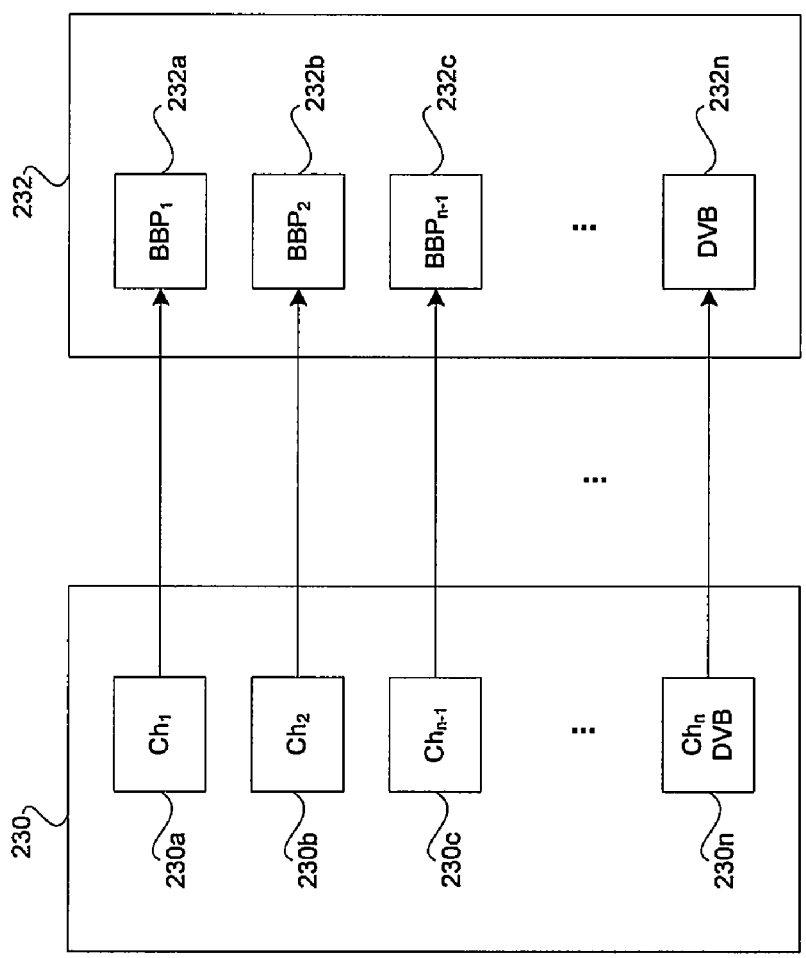
FIG. 2*c* is a high-level block diagram illustrating an exemplary configuration for a RFIC and a base band processing circuit, in accordance with an embodiment of the invention.

FIG. 2c is a high-level block diagram illustrating an exemplary configuration for a RFIC and a base band processing circuit, in accordance with an embodiment of the invention. Referring to FIG. 2c, there is shown RFIC 230 and baseband circuitry 232. The RFIC 230 comprises a plurality of RF processing circuits 230a, 230b, 230c and 230n. The RF processing circuits 230a, 230b, 230c and 230n may be integrated in a single integrated circuit (IC) or chip. The baseband processing circuitry 232 comprises a plurality of baseband processing circuits 232a, 232b, 232c and 232n. The baseband processing circuits 232a, 232b, 232c and 232n may be integrated into a single integrated circuit (IC) or chip.

In operation, each of the RF processing circuits in the RFIC 230 may be adapted to process a single channel. For example, each of the RF processing circuits 230a, 230b and 230c may be adapted to process separate cellular channel, namely, channel 1, channel 2 and channel (n-1), respectively. The RF processing circuit 230n many be adapted to process a VHF/UHF broadcast channel n.

Each of the baseband processing circuits in the baseband processing circuitry 230 may be adapted to process a single channel. For example, each of the baseband processing circuits 232a, 232b and 232c may be adapted to process separate cellular channels, namely, channel 1, channel 2 and channel (n-1), respectively. The RF processing circuit 232n may be adapted to process a VHF/UHF broadcast channel n. Use of a single RFIC and a single baseband processing integrated circuit saves on the size of the processing circuitry, which may significantly reduce cost.

Figure 2D:
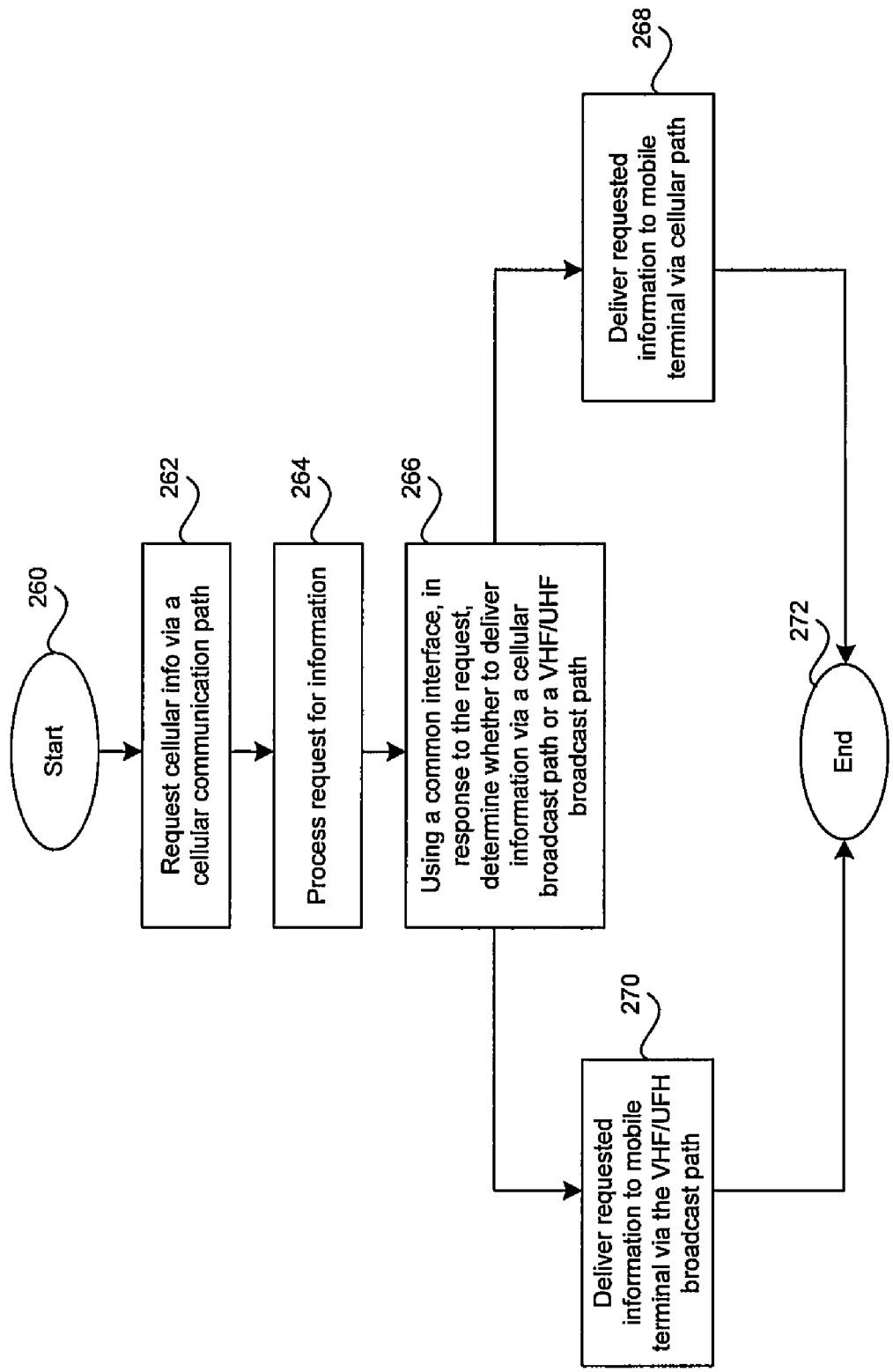
FIG. 2*d* is a flowchart illustrating exemplary steps that may be utilized in connection with an embodiment of the invention.

FIG. 2d is a flowchart illustrating exemplary steps that may be utilized in connection with an embodiment of the invention. Referring to FIG. 2d, in step 262, the a mobile terminal may request cellular information via a cellular communication path. In step 264, the request for information may be processed. In step 266, in response to the request, it may be determined whether to deliver information via a cellular broadcast path or a VHF/UHF broadcast path. In step 268, based on the determination in step 266, the requested information may be delivered to the mobile terminal via the cellular broadcast path. In step 270, based on the determination in step 266, the requested information may be delivered to the mobile terminal via the VHF/UHF broadcast path.

Figure 2E:
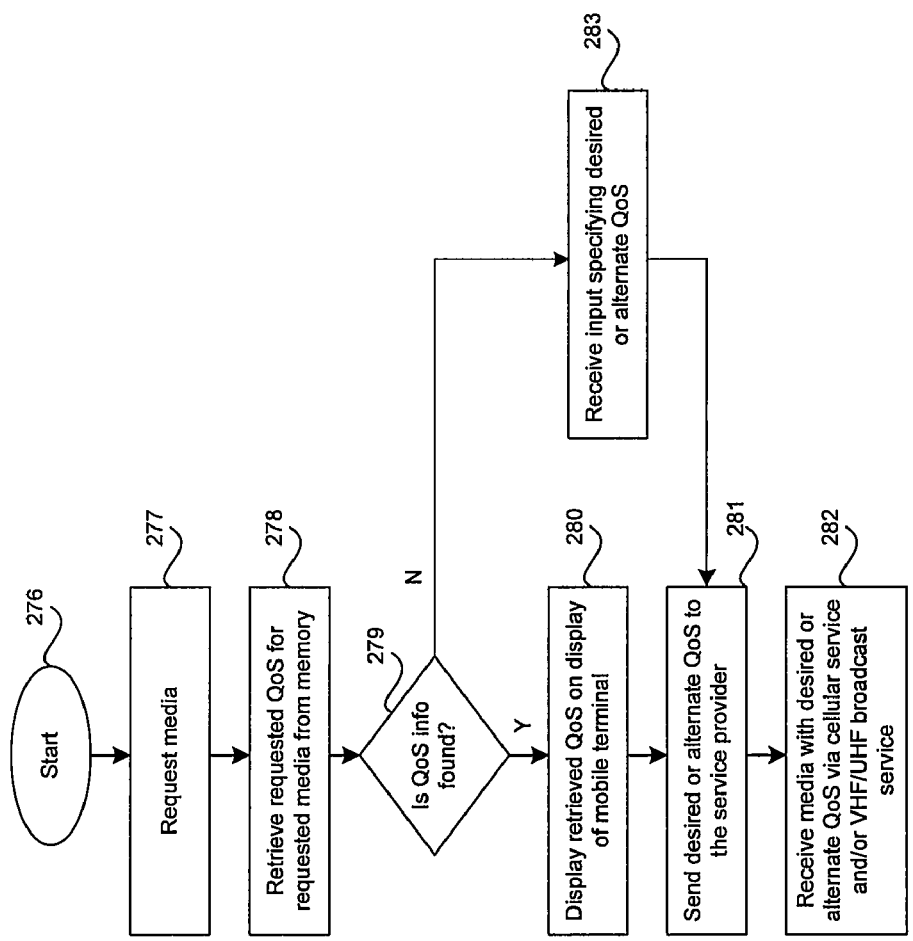
FIG. 2*e* is a flowchart illustrating exemplary steps that may be utilized for communicating information to a mobile terminal capable of receiving and processing cellular frequency band services and VHF/UHF broadcast frequency band services, in accordance with an embodiment of the invention.

FIG. 2e is a flowchart illustrating exemplary steps that may be utilized for communicating information to a mobile terminal capable of receiving and processing cellular frequency band services and VHF/UHF broadcast frequency band services, in accordance with an embodiment of the invention. Referring to FIG. 2e, the exemplary steps start at 276. In step 277, a mobile terminal may receive a request for media. In step 278, quality of service information for requested media may be retrieved from memory in the mobile terminal. In step 279, it may be determined whether related QoS information is found in memory. Requested QoS or alternate QoS information for the type of media may be stored in the memory, for example in a profile. If related QoS information is not found in the memory, then in step 283, an input specifying the requested QoS information or alternate QoS information may be received in the mobile terminal. Subsequently, in step 281, the input QoS and/or alternate QoS information may be communicated to the service provider. If related QoS information is found in the memory, then in step 280, the related QoS information may be retrieved and displayed on the mobile terminal. In step 281, the retrieved QoS information may be communicated to the service provider. In step 281, the mobile terminal may receive the media with the desired or alternate QoS formation via a cellular service and/or a VHF/UHF broadcast service.

Figure 2F:
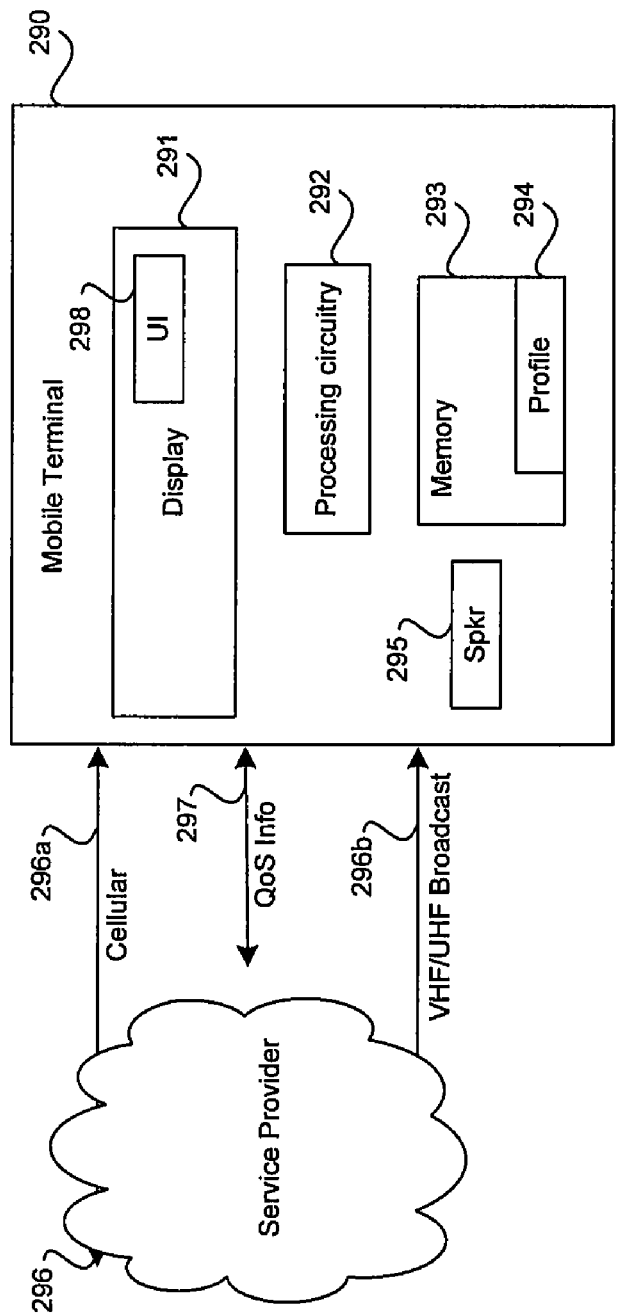
FIG. 2*f* is a diagram of an exemplary terminal that may be utilized for communication information via cellular frequency band services and VHF/UHF broadcast frequency band services, in accordance with an embodiment of invention.

FIG. 2f is a diagram of an exemplary terminal that may be utilized for communication information via cellular frequency band services and VHF/UHF broadcast frequency band services, in accordance with an embodiment of invention. Referring to FIG. 2f, there is shown a mobile terminal 290, and a service provider 296. The mobile terminal 290 may comprise a display 291, processing circuitry 292, memory 293 and speaker 295. The memory 293 may comprise a profile stored therein. The display 291 may be adapted to display media such as video and data. The speaker 295 may be adapted to present audio signals. The processing circuitry 292 may comprise suitable RF and baseband processing circuitry. The service provider 295 may be adapted to provide cellular services 296a and/or VHF/UHF broadcast services 296b.

In operation, the mobile terminal 290 is capable of receiving and processing cellular frequency band services 296a and VHF/UHF broadcast frequency band services 296b. The mobile terminal 290 may comprise a circuit that requests media having a specified quality of service. A user interface 298 in the mobile terminal 290 may be utilized to display a description of the requested media and/or a quality of service associated with the requested media on the display 91. The processing circuitry 292 in the mobile terminal 290 may receive an input that indicates at least one required quality of service 297 associated with the requested media. The memory 293 in the mobile terminal 290 may store information that may be utilized to determine at least one required quality of service associated with the requested media. A profile 294 stored in the memory 293 of the mobile terminal may store one or more required quality of service associated with the requested media. In this regard, a required and an alternate QoS 297 may be stored in the profile 294.

The processing circuitry 292 in the mobile terminal 290 may be adapted to receive the requested media from a wireless service provider providing the cellular frequency band services and/or from a VHF/UHF broadcast service provider providing the cellular frequency band services. In an embodiment of the invention, the processing circuitry 292 in the mobile terminal 290 may receive at least a portion of the requested media via a wireless service or cellular service provider, which provides the cellular frequency band services 296a. The processing circuitry 292 in the mobile 290 may also be adapted to receive at least a remaining portion of the requested media via VHF/UHF broadcast service provider, which provides the VHF/UHF broadcast frequency band services 296b.

The processing circuitry 292 in the mobile terminal 290 may be adapted to receive the cellular frequency band services 296a, which may be provided via global system for mobile communications (GSM), general packet radio service (GPRS), enhanced data rates for GSM evolution (EDGE), code division multiple access 2000 (CDMA2000), wideband CDMA (WCDMA), high speed downlink packet access (HSDPA) systems, and/or multiple broadcast/multicast service (MBMS). The processing circuitry 292 in the mobile terminal 290 may also receive the VHF/UHF broadcast frequency band services 296b, which may be provided via digital video broadcast (DVB), advanced standards technical committee (ATSC), and/or integrated service digital broadcasting (ISDB). The processing circuitry 292 in the mobile terminal 290 may be adapted to communicate RF channel condition from the mobile terminal 290 to the service provider 296 providing the cellular frequency band services and the VHF/UHF broadcast frequency band services. The service provider 296 may utilize the communicated RF channel condition to determine what QoS may be provided to the mobile terminal 298.

In an exemplary embodiment of the invention, a user at the mobile terminal 116a may request that audio be delivered in MP3 format encoded at 192 Kbits/sec, and may further request that encoded bit rates of less than 128 Kbits/sec may not be acceptable. The service provider 106 may try to meet the desired requirements, but if delivery of 192 Kbits/sec encoded MP3 files cannot be supported, the service provider 106 may provide 128 Kbits/sec encoded MP3 files. If the bandwidth is not available for the 128 Kbits/sec encoded MP3 audio files, then the service provider may not deliver any MP3 files at all until a later time, when sufficient bandwidth may be available to facilitate the transfer.

In another aspect of the invention, the bit rate of 128 Kbits/sec may be an alternate bit rate that may be acceptable. In this regard, any bit rate between 192 Kbit/sec and 128 Kbit/sec may be acceptable at the mobile terminal. Accordingly, the service provider may reduce the audio quality to as low as 128 Kbits/sec in order to facilitate transfer of the audio. A similar scenario may be utilized for video information. In this case, if there in insufficient bandwidth available over, for example, the terrestrial broadcast network 102 (FIG. 1a), the service provider 106 may be adapted to provide a reduced bit rate video that may be transmitted via, the terrestrial broadcast network 102 (FIG. 1a). The service provider 104 may also partition transfer of information to the mobile terminal. For example, during a multiple file transfer scenario, larger files may be transferred to the mobile terminal 116a via the terrestrial broadcast network 102 and smaller files may be transferred to the mobile terminal 116a via the wireless service provider network 104.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information via a plurality of different networks, the method comprising:
   requesting in a mobile terminal capable of receiving and processing cellular frequency band services and VHF/UHF broadcast frequency band services, media having a specified quality of service; and
   receiving at least a portion of said requested media having said specified quality of service from a wireless service provider providing said cellular frequency band services and receiving at least another portion of said requested media from a VHF/UHF broadcast service provider providing said broadcast frequency band services, based on information received from said wireless service provider and/or said VHF/UHF broadcast service provider.

2. The method according to claim 1, comprising displaying in said mobile terminal capable of receiving and processing cellular frequency band services and VHF/UHF broadcast frequency band services, a user interface comprising at least one of description of said requested media and a quality of service associated with said requested media.

3. The method according to claim 1, comprising receiving in said mobile terminal capable of receiving and processing cellular frequency band services and VHF/UHF broadcast frequency band services, an input indicating at least one required quality of service associated with said requested media.

4. The method according to claim 1, comprising determining based on information stored in said mobile terminal, at least one required quality of service associated with said requested media.

5. The method according to claim 4, wherein said at least one required quality of service associated with said requested media is stored in a profile within said mobile terminal.

6. The method according to claim 1, comprising receiving said requested media from a wireless service provider providing said cellular frequency band services.

7. The method according to claim 1, comprising receiving said requested media from a VHF/UHF broadcast service provider providing said broadcast frequency band services.

8. The method according to claim 1, comprising receiving, in said mobile terminal, said cellular frequency band services provided via at least one of global system for mobile communications (GSM), general packet radio service (GPRS), enhanced data rates for GSM evolution (EDGE), code division multiple access 2000 (CDMA2000), wideband CDMA (WCDMA), high speed downlink packet access (HSDPA) systems, and multiple broadcastlmulticast service (MBMS).

9. The method according to claim 1, comprising receiving, in said mobile terminal, said VHF/UHF broadcast frequency band services provided via at least one of digital video broadcast (DVB), advanced standards technical committee (ATSC), and integrated service digital broadcasting (ISDB).

10. The method according to claim 1, comprising communicating RF channel condition from said mobile terminal to a service provider providing said cellular frequency band services and said VHF/UHF broadcast frequency band services.

11. The method according to claim 1, wherein said wireless service provider and/or said VHF/UHF broadcast service provider determines how said requested media having said specified quality is delivered to said mobile terminal based on said communicated RF channel condition.

12. A machine-readable storage having stored thereon, a computer program having at least one code section for communicating information via a plurality of different networks, the at least one code section being executable by a machine for causing the machine to perform steps comprising:
  requesting in a mobile terminal capable of receiving and processing cellular frequency band services and VHF/UHF broadcast frequency band services, media having a specified quality of service; and
  receiving at least a portion of said requested media having said specified quality of service from a wireless service provider providing said cellular frequency band services and receiving at least another portion of said requested media from a VHF/UHF broadcast service provider providing said broadcast frequency band services, based on information received from said wireless service provider and/or said VHF/UHF broadcast service provider.

13. The machine-readable storage according to claim 12, comprising code for displaying in said mobile terminal capable of receiving and processing cellular frequency band services and VHF/UHF broadcast frequency band services, a user interface comprising at least one of description of said requested media and a quality of service associated with said requested media.

14. The machine-readable storage according to claim 12, comprising code for receiving in said mobile terminal capable of receiving and processing cellular frequency band services and VHF/UHF broadcast frequency band services, an input indicating at least one required quality of service associated with said requested media.

15. The machine-readable storage according to claim 12, comprising code for determining based on information stored in said mobile terminal, at least one required quality of service associated with said requested media.

16. The machine-readable storage according to claim 15, wherein said at least one required quality of service associated with said requested media is stored in a profile within said mobile terminal.

17. The machine-readable storage according to claim 12, comprising code for receiving said requested media from a wireless service provider providing said cellular frequency band services.

18. The machine-readable storage according to claim 12, comprising code for receiving said requested media from a VHF/UHF broadcast service provider providing said broadcast frequency band services.

19. The machine-readable storage according to claim 12, comprising code for receiving, in said mobile terminal, said cellular frequency band services provided via at least one of global system for mobile communications (GSM), general packet radio service (GPRS), enhanced data rates for GSM evolution (EDGE), code division multiple access 2000 (CDMA2000), wideband CDMA (WCDMA), high speed downlink packet access (HSDPA) systems, and multiple broadcastlmulticast service (MBMS).

20. The machine-readable storage according to claim 12, comprising code for receiving, in said mobile terminal, said VHF/UHF broadcast frequency band services provided via at least one of digital video broadcast (DVB), advanced standards technical committee (ATSC), and integrated service digital broadcasting (ISDB).

21. The machine-readable storage according to claim 12, comprising code for communicating RF channel condition from said mobile terminal to a service provider providing said cellular frequency band services and said VHF/UHF broadcast frequency band services.

22. The machine-readable storage according to claim 12, wherein said wireless service provider and/or said VHF/UHF broadcast service provider determines how said requested media having said specified quality is delivered to said mobile terminal based on said communicated RF channel condition.

23. A system for communicating information via a plurality of different networks, the system comprising: circuitry in a mobile terminal capable of receiving and processing cellular frequency band services and VHF/UHF broadcast frequency band services, that requests media having a specified quality of service; and said circuitry receives at least a portion of said requested media having said specified quality of service from a wireless service provider providing said cellular frequency band services and receives at least another portion of said requested media from a VHF/UHF broadcast service provider providing said broadcast frequency band services, based on information received from said wireless service provider and/or said VHF/UHF broadcast service provider.

24. The system according to claim 23, comprising circuitry in said mobile terminal capable of receiving and processing cellular frequency band services and VHF/UHF broadcast frequency band services, that displays a user interface comprising at least one of description of said requested media and a quality of service associated with said requested media.

25. The system according to claim 23, comprising circuitry in said mobile terminal capable of receiving and processing cellular frequency band services and VHF/UHF broadcast frequency band services, that receives an input indicating at least one required quality of service associated with said requested media.

26. The system according to claim 23, comprising circuitry in said mobile terminal that determines based on information stored in said mobile terminal, at least one required quality of service associated with said requested media.

27. The system according to claim 26, wherein said at least one required quality of service associated with said requested media is stored in a profile within said mobile terminal.

28. The system according to claim 23, comprising circuitry in said mobile terminal that receives said requested media from a wireless service provider providing said cellular frequency band services.

29. The system according to claim 23, comprising circuitry in said mobile terminal that receives said requested media from a VHF/UHF broadcast service provider providing said broadcast frequency band services.

30. The system according to claim 23, comprising circuitry in said mobile terminal that receives said cellular frequency band services provided via at least one of global system for mobile communications (GSM), general packet radio service (GPRS), enhanced data rates for GSM evolution (EDGE), code division multiple access 2000 (CDMA2000), wideband CDMA (WCDMA), high speed downlink packet access (HSDPA) systems, and multiple broadcast/multicast service (MBMS).

31. The system according to claim 23, comprising circuitry in said mobile terminal that receives said VHF/UHF broadcast frequency band services provided via at least one of digital video broadcast (DVB), advanced standards technical committee (ATSC), and integrated service digital broadcasting (ISDB).

32. The system according to claim 23, comprising circuitry in said mobile terminal communicates RF channel condition from to a service provider providing said cellular frequency band services and said VHF/UHF broadcast frequency band services.

33. The system according to claim 23, wherein said wireless service provider and/or said VHF/UHF broadcast service provider determines how said requested media having said specified quality is delivered to said mobile terminal based on said communicated RF channel condition.

* * * * *